(12) United States Patent
Linke et al.

(10) Patent No.: US 6,211,346 B1
(45) Date of Patent: Apr. 3, 2001

(54) METAL COMPLEX PIGMENTS

(75) Inventors: Frank Linke, Köln; Kent Faubion, Leverkusen; Udo Herrmann, Dormagen; Dirk Pfützenreuter, Burscheid; Ronald Göbel, Leverkusen, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/415,339

(22) Filed: Oct. 8, 1999

(30) Foreign Application Priority Data

Oct. 15, 1998 (DE) .............................. 198 47 586
May 29, 1999 (DE) .............................. 199 24 764

(51) Int. Cl.$^7$ .......................... C09B 29/036; C09B 67/20; D06P 5/00
(52) U.S. Cl. .......................... 534/707; 8/637.1; 106/496; 524/190
(58) Field of Search .......................... 534/707; 106/496; 524/190; 8/637.1

(56) References Cited

U.S. PATENT DOCUMENTS

| | | | |
|---|---|---|---|
| 4,094,699 | 6/1978 | Fitzgerald | 106/288 Q |
| 4,622,391 | * 11/1986 | Lorenz et al. | 534/707 |
| 4,628,082 | * 12/1986 | Lorenz et al. | 534/707 |
| 6,077,339 | * 6/2000 | Nyssen et al. | 106/496 |

FOREIGN PATENT DOCUMENTS

| | | |
|---|---|---|
| 350746 | 1/1961 | (CH) . |
| 195 35 246 | 3/1997 | (DE) . |
| 195 35 256 | 4/1997 | (DE) . |
| 197 12 486 | 10/1998 | (DE) . |
| 0 073 464 | 3/1983 | (EP) . |
| 0 518 225 | 12/1992 | (EP) . |
| 0 556 649 | 8/1993 | (EP) . |
| 1336686 | 11/1973 | (GB) . |
| 1416076 | 12/1975 | (GB) . |

OTHER PUBLICATIONS

K. Lidner, Tenside–Textilhilfs–mittel–Waschrohstoffe, $2^{nd}$ edtion, vol. 1, Wissenschaftliche mbH, Stuttgart, (month unavailable) 1964, pp. 555–559 (table of contents only attached).

* cited by examiner

*Primary Examiner*—Fiona T. Powers
(74) *Attorney, Agent, or Firm*—Joseph C. Gil; Richard E.L. Henderson

(57) ABSTRACT

Metal complexes of an azo compound which in the form of its tautomeric structures conforms to the formula (I)

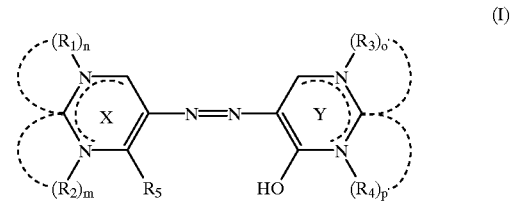

wherein
the substituents are each as defined in the description, and which metal complexes host a compound as guest compound,
characterized in that they have a dispersing harshness of less than 250.

15 Claims, No Drawings

METAL COMPLEX PIGMENTS

This invention relates to new metal complex pigments, processes for producing them and their use.

EP-A-73 463 discloses coloristically valuable pigments. These still have application disadvantages, however. For instance, pigments prepared in the manner described are very harsh in texture and have to be comminuted in relatively time-consuming dispersing processes to obtain the desired coloristics and hence the conforming particle size. Yet, such pigments still have some disadvantages in dispersibility and colour strength.

It is accordingly an object of the present invention to provide new pigmentary forms free of the above-described disadvantages.

According to the invention there are provided metal complexes of an azo compound which in the form of its tautomeric structures conforms to the formula (I)

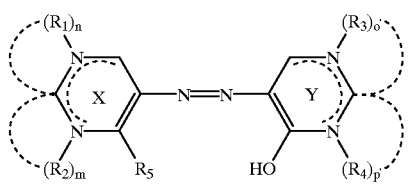

(I)

wherein the rings X and Y may each independently bear one or two substituents selected from the group consisting of $=O$, $=S$, $=NR_7$, $-NR_6H_7$, $-OR_6$, $-SR_6$, $-COOR_6$, $-CN$, $-CONR_6R_7$, $-SO_2R_8$,

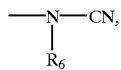

alkyl, cycloalkyl, aryl and aralkyl, the sum total of the endo- and exocyclic double bonds being three for each of the rings X and Y, $R_6$ is hydrogen, alkyl, cycloalkyl, aryl or aralkyl, $R_7$ is hydrogen, cyano, alkyl, cycloalkyl, aryl, aralkyl or acyl, $R_8$ is alkyl, cycloalkyl, aryl or aralkyl, $R_1$, $R_2$, $R_3$ and $R_4$ are each independently hydrogen, alkyl, cycloalkyl, aryl or aralkyl and furthermore, as indicated by the broken lines in the formula (I), may form 5- or 6-membered rings to which further rings may be fused, $R_5$ is $-OH$, $-NR_6R_7$, alkyl, cycloalkyl, aryl or aralkyl, the substituents mentioned for $R_1$ to $R_8$ which contain CH bonds may in turn be substituted, and m, n, o and p are each 1 or, if the ring nitrogen atoms are the starting points for double bonds, as indicated by the dotted lines in the formula (I), may also be zero, and which metal complexes host at least one compound as guest compound, characterized in that they have a dispersing harshness of less than 250 (measured according to DIN 53 775).

Preferred organic metal complexes are those of azo compounds which in the form of their free acid conform to one of the tautomeric forms of the formula (I) where the X ring represents a ring of the formula

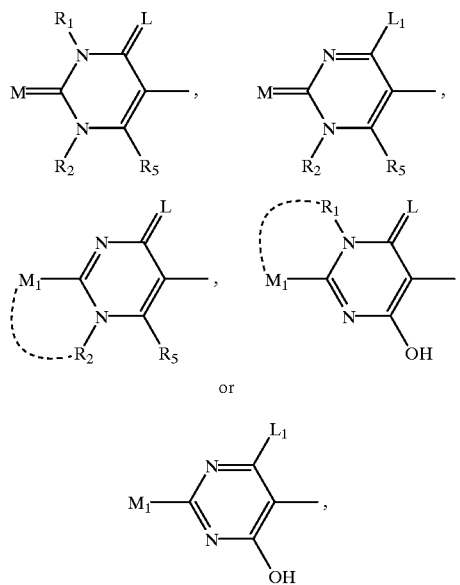

or

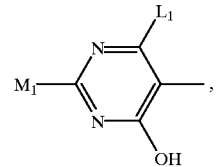

where

L and M are each independently $=O$, $=S$ or $=NR_6$, $L_1$ is hydrogen, $-OR_6$, $-SR_6$, $-NR_6R_7$, $-COOR_6$, $-CONR_6R_7$, $-CN$, alkyl, cycloalkyl, aryl or aralkyl, $M_1$ is $-OR_6$, $-SR_6$, $-NR_6R_7$, $-COOR_6$, $-CONR_6R_7$, $-CN$, $-SO_2R_8$,

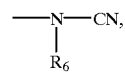

alkyl, cycloalkyl, aryl or aralkyl, and the substituents $M_1$ and $R_1$ or $M_1$ and $R_2$ may form a 5- or 6-membered ring.

Particularly preferred organic metal complexes are those of azo compounds which in the form of their free acids conform to one of their tautomeric structures of the formulae (II) or (III)

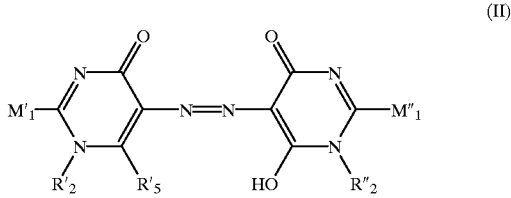

(II)

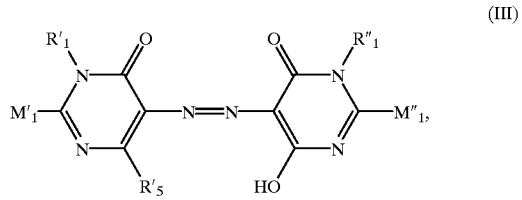

(III)

where $R'_5$ is $-OH$ or $-NH_2$, $R'_1$, $R''_1$, $R'_2$ and $R''_2$ are each hydrogen, and $M'_1$, and $M''_1$ are each independently hydrogen, $-OH$, $-NH_2$, $-NHCN$, arylamino or acylamino.

Very particularly preferred metal complexes are those of azo compounds of the formula (I) which in the form of their free acid conform to one of the tautomeric structures of the formula (IV)

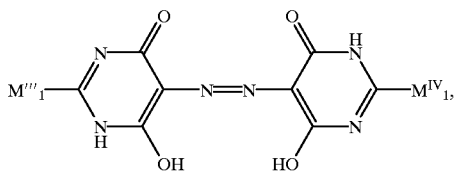

(IV)

where

M'''$_1$ and M$^{IV}_1$ are each independently OH or NHCN.

Preference is given especially to organic metal complexes of those azo compounds of the formula (I) which in the form of their free acid conform to one of the tautomeric structures of the formula (V)

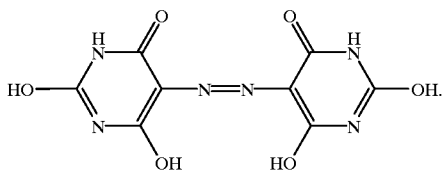

(V)

In the foregoing formulae, the substituents preferably have the following meanings:

Alkyl substituents are preferably $C_1$–$C_6$-alkyl, which may be substituted for example by halogen, such as chlorine, bromine or fluorine, —OH, —CN, —NH$_2$ or $C_1$–$C_6$-alkoxy.

Cycloalkyl substituents are preferably $C_3$–$C_7$-cycloalkyl, especially $C_5$–$C_6$-cycloalkyl, which may be substituted for example by $C_1$–$C_6$-alkyl, $C_1$–$C_6$-alkoxy, halogen such as Cl, Br or F, $C_1$–$C_6$-alkoxy, —OH, —CN or NH$_2$.

Aryl substituents are preferably phenyl or naphthyl, which may each be substituted for example by halogen such as F, Cl or Br, —OH, $C_1$–$C_6$-alkyl, $C_1$–$C_6$-alkoxy, —NH$_2$, —NO$_2$ or —CN.

Aralkyl substituents are preferably phenyl- or naphthyl-$C_1$–$C_4$-alkyl, which may be substituted in the aromatic radicals by halogen such as F, Cl or Br, —OH, $C_1$–$C_6$-alkyl, $C_1$–$C_6$-alkoxy, —NH$_2$, —NO$_2$ or —CN, for example.

Acyl substituents are preferably ($C_1$–$C_6$-alkyl)carbonyl, phenylcarbonyl, $C_1$–$C_6$-alkylsulphonyl, phenylsulphonyl, optionally $C_1$–$C_6$-alkyl-, phenyl- or naphthyl-substituted carbamoyl, optionally $C_1$–$C_6$-alkyl-, phenyl- or naphthyl-substituted sulphamoyl or optionally $C_1$–$C_6$-alkyl-, phenyl- or naphthyl-substituted guanyl, where the alkyl radicals mentioned may be substituted for example by halogen such as Cl, Br or F, —OH, —CN, —NH$_2$ or $C_1$–$C_6$-alkoxy and the phenyl and naphthyl radicals mentioned may be substituted for example by halogen such as F, Cl or Br, —OH, $C_1$–$C_6$-alkyl, $C_1$–$C_6$-alkoxy, —NH$_2$, —NO$_2$ or —CN.

If $M_1R_1$ or $M_1R_2$ or $M_1R_2$ and $R_1, R_2, R_3, R_4$, as indicated by the broken lines in the formula (I), form 5- or 6-membered rings, these are preferably triazole, imidazole or benzimidazole, pyrimidine or quinazoline ring systems.

Metal complexes, which is also to be understood as meaning metal salts, of the formulae (I) to (V) preferably include the salts and complexes of the mono-, di-, tri- and tetraanions with the metals Li, Cs, Mg, Cd, Co, Al, Cr, Sn, Pb, particularly preferably Na, K, Ca, Sr, Ba, Zn, Fe, Ni, Cu and Mn.

Particular preference is given to salts and complexes of the formulae (I) to (V) with di- or trivalent metals, very particularly the nickel salts and complexes.

The metal complexes which contain at least one compound, especially organic compound, as guest can be present as host-guest compounds, intercalation compounds and also as solid solutions.

They are very particularly preferably inclusion compounds, intercalation compounds and solid solutions in which the azobarbituric acid/nickel 1:1 complex conforms to one of the tautomeric forms of the formula

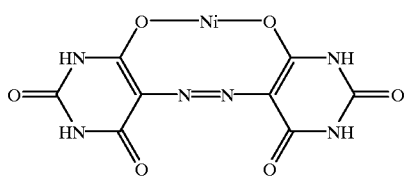

(VI)

and includes at least one other organic compound.

In general, the metal complex forms a layered crystal lattice in which the bonding within a layer is essentially via hydrogen bonds and/or metal ions. Preferably, the metal complexes are metal complexes which form a crystal lattice which consists essentially of planar layers.

For the purposes of the present invention, the metal complexes of the azo compounds of the formula (I) which contain at least one compound as guest compound and have a dispersing harshness of less than 250 are referred to as pigments according to the invention. In a preferred embodiment, the pigments according to the invention have a dispersing harshness of less than 200, especially less than 150.

The dispersing harshness is measured according to DIN 53 775 Part 7, the cold rolling temperature being 25° C. and the hot rolling temperature 150° C.

All the dispersing harshnesses reported herein were determined by this modified DIN method.

In a preferred embodiment, the pigment according to the invention has a BET specific surface area of less than 150 m$^2$/g, especially of 50 to 130 m$^2$/g.

Useful metal complexes also include metal complexes in which a metal-containing compound, for example a salt or metal complex, is incorporated into the crystal lattice of another metal complex, for example of the nickel complex. In this case, in the formula (VI), a portion of the metal, for example of the nickel can be replaced by other metal ions, or further metal ions can enter into a more or less pronounced interaction with the metal, preferably nickel complex.

Included compounds may be organic compounds and inorganic compounds. Compounds which can be included come from a very wide variety of classes of compounds. For purely practical reasons, preference is given to such compounds as are liquid or solid under normal conditions (25° C., 1 bar).

Of the liquid substances, preference is given in turn to those which have a boiling point (1 bar) of 100° C. or higher, preferably of 150° C. and higher. Suitable compounds are preferably acyclic and cyclic organic compounds, for example aliphatic and aromatic hydrocarbons, which may be substituted, for example by OH, COOH, NH$_2$, substituted NH$_2$, CONH$_2$, substituted CONH$_2$, SO$_2$NH$_2$, substituted SO$_2$NH$_2$, SO$_3$H, halogen, NO$_2$, CN, —SO$_2$-alkyl, —SO$_2$-aryl, —O-alkyl, —O-aryl, —O-acyl.

Specific examples are paraffins and paraffin oils; triisobutylene, tetraisobutylene, mixtures of aliphatic and aromatic hydrocarbons as produced in petroleum fractionation for example; chlorinated paraffin hydrocarbons such as dodecyl chloride or stearyl chloride; $C_{10}$–$C_{30}$-alcohols such as 1-decanol, 1-dodecanol, 1-hexadecanol, 1-octadecanol and their mixtures, olein alcohol, 1,12-octadecanediol, fatty acids and their salts and mixtures, for example formic acid, acetic acid, dodecanoic acid, hexadecanoic acid, octadecanoic acid, oleic acid, fatty acid esters, for example the methyl esters of $C_{10}$–$C_{20}$-fatty acids, fatty acid amides, such as stearamide, stearic acid monoethanolamide, stearic acid diethanolamide, stearonitrile, fatty amines, for example dodecylamine, cetylamine, hexadecylamine, octadecylamine and others; salts of fatty amines with sulphonic and carboxylic acids, isocyclic hydrocarbons such as cyclododecane, decahydronaphthalene, o-, m-, p-xylene, mesitylene, dodecylbenzene mixture, tetralin, naphthalene, 1-methylnaphthalene, 2-methylnaphthalene, biphenyl, diphenylmethane, acenaphthene, fluorene, anthracene, phenanthrene, m-, p-terphenyl, o-, p-dichlorobenzene, nitrobenzene, 1-chloronaphthalene, 2-chloronaphthalene, 1-nitronaphthalene, isocyclic alcohols and phenols and their derivatives such as benzyl alcohol, decahydro-2-naphthol, diphenyl ether, sulphones, for example diphenyl sulphone, methyl phenyl sulphone, 4,4'-bis-2-(hydroxyethoxy) diphenyl sulphone; isocyclic carboxylic acids and their derivatives such as benzoic acid, 3-nitrobenzoic acid, cinnamic acid, 1-naphthalenecarboxylic acid, phthalic acid, dibutyl phthalate, dioctyl phthalate, tetrachlorophthalic acid, 2-nitrobenzamide, 3-nitrobenzamide, 4-nitrobenzamide, 4-chlorobenzamide, sulphonic acids, such as 2,5-dichlorobenzenesulphonic acid, 3-nitro-, 4-nitrobenzenesulphonic acid, 2,4-dimethylbenzenesulphonic acid, 1- and 2-naphthalenesulphonic acid, 5-nitro-1- and 5-nitro-2-naphthalenesulphonic acid, di-sec-butylnaphthalenesulphonic acid mixture, biphenyl-4-sulphonic acid, 1,4-, 1,5-, 2,6-, 2,7-naphthalenedisulphonic acid, 3-nitro-1,5-naphthalenedisulphonic acid, 1-anthraquinonesulphonic acid, 2-anthraquinonesulphonic acid, biphenyl-4,4'-disulphonic acid, 1,3,6-naphthalenetrisulphonic acid and the salts of these sulphonic acids e.g. the sodium, potassium, calcium, zinc, nickel and copper salts; sulphonamides such as benzenesulphonamide, 2-, 3- and 4-nitrobenzenesulphonamide, 2-, 3- and 4-chlorobenzenesulphonamide, 4-methoxybenzenesulphonamide, 3,3'-sulphonylbisbenzenesulphonamide, 4,4'-oxybisbenzenesulphonamide, 1- and 2-naphthalenesulphonamide.

Carboxamides and sulphonamides are a preferred group of compounds to be included, also suitable in particular are urea and substituted ureas such as phenylurea, dodecylurea and others; and also their polycondensates with aldehydes, especially formaldehyde', heterocycles such as barbituric acid, benzimidazolone, 5-benzimidazolonesulphonic acid, 2,3-dihydroxyquinoxaline, 2,3-dihydroxyquinoxaline-6-sulphonic acid, carbazole, carbazole-3,6-disulphonic acid, 2-hydroxyquinoline, 2,4-dihydroxyquinoline, caprolactam, melamine, 6-phenyl-1,3,5-triazine-2,4-diamine, 6-methyl-1, 3,5-triazine-2,4-diamine, cyanuric acid.

Preferred solid solutions, intercalation compounds or inclusion compounds contain included surface-active compounds, especially surfactants, which are known for example from K. Lindner, Tenside-Textilhilfsmittel-Waschrohstoffe, $2^{nd}$ edition, Volume I, Wissenschaftliche Verlagsgesellschaft mbH, Stuttgart, 1964. They can be anionic, non-ionic or cationic compounds or ampholytes. Examples of suitable anionic compounds are true soaps, salts of aminocarboxylic acids, salts of lower or higher acylated aminocarboxylic acids, fatty acid sulphates, sulphates of fatty acid esters, amides etc., primary alkyl sulphates, sulphates of oxo alcohols, secondary alkyl sulphates, sulphates of esterified or etherified polyoxy compounds, sulphates of substituted polyglycol ethers (sulphated ethylene oxide adducts), sulphates of acylated or alkylated alkanolamines, sulphonates of fatty acids, their esters, amides, etc., primary alkyl sulphonates, secondary alkyl sulphonates, alkyl sulphonates with acyls attached in ester fashion, alkyl or alkylphenyl ether sulphonates, sulphonates of polycarboxylic esters, alkylbenzenesulphonates, alkylnaphthalenesulphonates, fatty aromatic sulphonates, alkylbenzimidazolesulphonates, phosphates, polyphosphates, phosphonates, phosphinates, thiosulphates, hydrosulphites, sulphinates, persulphates. Examples of suitable non-ionic compounds are esters and ethers of polyalcohols, alkyl polyglycol ethers, acyl polyglycol ethers, alkylaryl polyglycol ethers, acylated and alkylated alkanolamine polyglycol ethers. Examples of suitable cationic compounds are alkylamine salts, quaternary ammonium salts, alkylpyridinium salts, simple and quaternary imidazoline salts, alkyldiamines and alkylpolyamines, acyldiamines and acylpolyamines, acylalkanolamines, alkanolamine esters, alkyl-$OCH_2$—N-pyridinium salts, alkyl-CO—NH—$CH_2$—N-pyridinium salts, alkylethyleneureas, sulphonium compounds, phosphonium compounds, arsenium compounds, alkylguanidines, acylbiguanidides. Examples of suitable ampholytes are alkylbetaines, sulphobetaines and aminocarboxylic acids. Preference is given to using non-ionic surfactants, especially the ethylene oxide addition products of fatty alcohols, fatty amines and also of octyl- or nonylphenol.

A further important group of guest compounds are natural resins and resin acids such as for example abietic acid and its conversion products and salts. Examples of such conversion products are hydrogenated, dehydrogenated and disproportionated abietic acids. These can further be dimerized, polymerized or modified by addition of maleic anhydride and fumaric acid. Also of interest are the resin acids modified at the carboxyl group such as for example the methyl, hydroxyethyl, glycol, glyceryl and pentaerythritol esters and also resin acid nitriles and resin acid amines and also dehydroabietyl alcohol.

Also suitable for inclusion are polymers, preferably water-soluble polymers, for example ethylene-propylene oxide block polymers, preferably those having an $M_n$ greater than 2000 g/mol, especially greater than 2000 and less than 10,000 g/mol, polyvinyl alcohol, poly(meth)-acrylic acids, modified cellulose, such as carboxymethylcelluloses, hydroxyethyl- and -propylcelluloses, methyl- and ethylhydroxyethylcelluloses.

Other suitable guest compounds are condensation products based on

A) sulphonated aromatics,

B) aldehydes and/or ketones and optionally

C) one or more compounds selected from the group of the non-sulphonated aromatics, urea and urea derivatives.

Based on means that the condensation product was optionally prepared from other reactants besides A, B and optionally C. Preferably, however, the condensation products for the purposes of this invention are prepared only from A, B and optionally C.

The sulphonated aromatics of component A) will be understood in the context of this invention as including sulphomethylated aromatics as well. Preferred sulphonated aromatics are naphthalenesulphonic acids, phenolsulphonic acids, dihydroxybenzenesulphonic acids, sulphonated ditolyl ethers, sulphomethylated 4,4'-dihydroxydiphenyl sulphone, sulphonated diphenylmethane, sulphonated biphenyl, sulphonated hydroxybiphenyl, especially 2-hydroxybiphenyl, sulphonated terphenyl or benzenesulphonic acids.

Aldehydes and/or ketones useful as component B) include in particular aliphatic, cycloaliphatic and also aromatic ones. Preference is given to aliphatic aldehydes, particularly preferably formaldehyde and other aliphatic aldehydes of 3 to 5 carbon atoms.

Examples of non-sulphonated aromatics useful as component C) are phenol, cresol, 4,4'-dihydroxydiphenyl sulphone and dihydroxydiphenylmethane.

Examples of urea derivatives are dimethylolurea, alkylureas, melamine and guanidine.

Preference is given to a condensation product based on
A) at least one sulphonated aromatic selected from the group consisting of naphthalenesulphonic acids, phenolsulphonic acids, dihydroxybenzenesulphonic acids, sulphonated ditolyl ethers, sulphomethylated 4,4'-dihydroxydiphenyl sulphone, sulphonated diphenylmethane, sulphonated biphenyl, sulphonated hydroxybiphenyl, especially 2-hydroxybiphenyl, sulphonated terphenyl and benzenesulphonic acids,
B) formaldehyde and optionally
C) one or more compounds selected from the group consisting of phenol, cresol, 4,4'-dihydroxydiphenyl sulphone, dihydroxydiphenylmethane, urea, dimethylolurea, melamine and guanidine.

Preferred condensation products are condensation products based on 4,4'-dihydroxydiphenyl sulphone, sulphonated ditolyl ether and formaldehyde; 4,4'-dihydroxydiphenyl sulphone, phenolsulphonic acid and formaldehyde; 4,4'-dihydroxydiphenyl sulphone, sodium bisulphite, formaldehyde and urea; naphthalenesulphonic acid, 4,4'-dihydroxydiphenyl sulphone and formaldehyde; sulphonated terphenyl and formaldehyde; and/or sulphonated 2-hydroxybiphenyl and formaldehyde and also naphthalenesulphonic acid and formaldehyde.

Particular preference for use as guest compounds is given to melamine or melamine derivatives, especially those of the formula (VII)

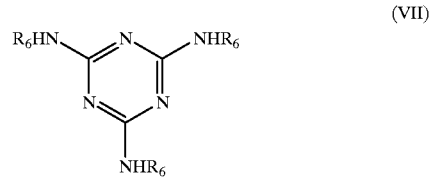

where
$R_6$ is hydrogen or $C_1$–$C_4$-alkyl, which is optionally substituted by OH groups,
very particularly preferably where
$R_6$ is hydrogen.

The amount of substance which can be incorporated as guest compounds in the crystal lattice of the metal complex is generally 5% to 200% by weight, based on the amount of host compound. Preference is given to a guest compound amount of 10 to 100% by weight. The amount referred to here is the amount of substance which is not washed out by suitable solvents and which is obtained from the elemental analysis. Naturally, it is also possible to add more or less than the aforementioned amount of substance, and it may be optionally dispensed with to wash an excess out. Preference is given to amounts of 10 to 150% by weight.

The invention further relates to a process for preparing the pigments of claim 1, characterized in that metal complexes of an azo compound of the formula (I) which contain a compound as guest compound and have a dispersing harshness of greater than 250 (according to DIN 53 755) are heat-treated in the presence of water and optionally organic solvents either at a pH of 1 to 4, preferably 1 to 3, especially 1.5 to 2.5, or at a pH of 9 to 13, preferably of 10 to 11, and at a temperature of 80 to 180° C., preferably 90 to 140° C., especially at 95 to 110° C.

The process is preferably complete when a dispersing harshness of less than 250 has been reached.

The process takes place at temperatures above 100° C., preferably in an autoclave.

Possible organic solvents are water-soluble or water-miscible solvents. It is also possible to use mixtures of different solvents and also optionally polymeric, high-boiling solvents having a boiling point of higher than 250° C. According to the invention, there is no restriction with regard to the solvents to be used. More particularly, compounds from the group of the aliphatic, cycloaliphatic or aromatic hydrocarbons and terpene hydrocarbons, also alcohols, glycol and polyglycol ethers, esters and ketones are suitable. It is also possible to use aminic solvents, especially those based on primary, secondary and tertiary, aliphatic and also aromatic or cycloaliphatic amines and their mixtures and derivatives.

Suitable organic solvents are aliphatic $C_1$–$C_4$-alcohols, such as methanol, ethanol, isopropanol, n-propanol, n-butanol, isobutanol or tert-butanol, aliphatic ketones, such as acetone, methyl ethyl ketone, methyl isobutyl ketone or diacetone alcohol, polyols, such as ethylene glycol, propylene glycol, butylene glycol, diethylene glycol, triethylene glycol, trimethylolpropane, polyethylene glycol having an average molecular weight of 100 to 4000, preferably 400 to 1500, g/mol or glycerol, monohydroxyethers, preferably monohydroxyalkyl ethers, particularly preferably mono-$C_1$–$C_4$-alkyl glycol ethers such as ethylene glycol monoalkyl, monomethyl, diethylene glycol monomethyl ether or diethylene glycol monoethyl ether, diethylene glycol monobutyl ether, dipropylene glycol monoethyl ether, thiodiglycol, triethylene glycol monomethyl ether or monoethyl ether, also 2-pyrrolidone, N-methyl-2-pyrrolidone, N-ethylpyrrolidone, N-vinylpyrrolidone, 1,3-dimethylimidazolidone, dimethylacetamide and also dimethylformamide.

They preferably have a boiling point of greater than 100° C./atmospheric pressure.

The pH is preferably set using inorganic or organic acids and bases.

Preferred acids are HCl, $H_3PO_4$. $H_2SO_4$, HI, HBr, acetic acid and/or formic acid.

Preferred bases are LiOH, KOH, NaOH, $Ca(OH)_2$, $NH_3$, ethanolamine, diethanolamine, triethanolamine and/or dimethylethanolamine.

In a preferred embodiment, the heat treatment takes place at pH values of 1 to 4.

Pigments used in the process of the invention as having a dispersing harshness of greater than 250 are particularly preferably pigments which are directly obtained by reaction of azo compounds of the formula (I) with metal salts, preferably those having a water solubility of more than 20, especially more than 50, g/l at 20° C. and subsequently by reaction with the compound to be intercalated.

Pigments having a dispersing harshness of greater than 250, hereinafter called educts, are preferably obtained as follows in such a way that the reaction with the metal compound takes place at a pH≦2. The subsequent intercalation preferably takes place at a pH of 1 to 7. If the intercalation is carried out at pH<4, it is preferable subsequently to raise the pH to more than 4.5, preferably 4.5 to 7.

This educt suspension can then in turn be filtered and the remaining educt washed, preferably with water, especially hot water, so as to remove non-intercalated fractions, salts and other impurities. The thusly intermediately isolated, optionally dried educt can then be heat-treated at 80 to 180° C. at pH 1–4 or 9 to 13.

Alternatively, this educt suspension can be readjusted to a pH of 1 to 4 or to a pH of 9 to 13 and heat-treated at a temperature of 80 to 180° C.

The heat-treated suspension containing the pigment according to the invention is preferably readjusted back to a pH of 4.5 to 7 after the heat treatment. Thereafter, it is preferably filtered. The thusly obtained press cake can optionally be dried after washing with water.

Useful drying processes include on the one hand conventional drying processes such as paddle drying etc. Such drying processes and subsequent grinding of the pigment in a conventional manner makes it possible to obtain pulverulent pigments.

Preferably, the press cake is spray-dried as an aqueous slurry. Particularly preferably, this is accomplished by spray-drying a slurry which contains ammonia to increase the solids content. The slurry to be spray-dried preferably has a solids content of 10 to 40% by weight, especially 15 to 30% by weight.

The slurry may further contain viscosity-reducing additives such as carboxylic acid and sulphonic acid amides in an amount of up to 10% by weight, based on the slurry.

Examples of useful carboxamides and sulphonamides are urea and substituted ureas such as phenylurea, dodecylurea and others; heterocycles such as bartbituric acid, benzimidazolone, benzimidazolone-5-sulphonic acid, 2,3-dihydroxyquinoxaline, 2,3-dihydroxyquinoxaline-6-sulphonic acid, carbazole, carbazole-3,6-disulphonic acid, 2-hydroxyquinoline, 2,4-dihydroxyquinoline, caprolactam, melamine, 6-phenyl-1,3,5-triazine-2,4-diamine, 6-methyl-1,3,5-triazine-2,4-diamine, cyanuric acid.

If further additives are to be used, they are preferably added prior to drying. Examples of useful additives are for example the hereinbelow mentioned ingredients of the preparations according to the invention:

Suitable dryers for the drying include in principle all dryers, for example vacuum dryers, circulating air dryers, especially spray dryers, especially one- and two-material and also rotary disc dryers. Fluidized bed drying processes are also suitable.

Examples of suitable single-material nozzle dryers are those having a spiral chamber nozzle.

In a very particularly preferred embodiment of the process according to the invention, the base used is ammonia optionally together with further bases which are not volatile during the drying and the resultant aqueous slurry, preferably having a solids content of 5 to 40% by weight, is spray-dried. This use of ammonia-containing slurries leads to particularly advantageous granules, distinguished by very good dispersibility, colour strength and brilliance on the substrate. In addition, they are free-flowing and extremely low-dust.

The invention further provides pigment preparations comprising at least one pigment according to the invention and at least one dispersant.

Dispersants for the purposes of the present invention are substances which stabilize the pigment particles in their fine particulate form in aqueous media. Finely particulate is preferably understood as meaning a fine division of 0.001 to 5 µm, especially of 0.005 to 1 µm, particularly preferably of 0.005 to 0.5 µm.

Suitable dispersants are for example anionic, cationic, amphoteric or non-ionic.

Suitable anionic dispersants are in particular condensation products of aromatic sulphonic acids with formaldehyde, such as condensation products of formaldehyde and alkyl-naphthalenesulphonic acids or of formaldehyde, naphthalenesulphonic acids and/or benzenesulphonic acids, condensation products of optionally substituted phenol with formaldehyde and sodium bisulphite. Also suitable are dispersants from the group of the sulphosuccinic esters and alkylbenzenesulphonates. Also sulphated, alkoxylated fatty acid alcohols or salts thereof. Alkoxylated fatty acid alcohols are to be understood as meaning in particular those $C_6$–$C_{22}$ fatty acid alcohols which are provided with 5 to 120, preferably 5 to 60, especially with 5 to 30, ethylene oxide and are saturated or unsaturated, especially stearyl alcohol. Particular preference is given to a stearyl alcohol alkoxylated with 8 to 10 ethylene oxide units. The sulphated alkoxylated fatty acid alcohols are preferably present as salts, especially as alkali metal or amine salts, preferably as diethylamine salt. Also suitable in particular are ligninsulphonates, for example those which are obtained by the sulphite or kraft process. Preferably they are products which are partially hydrolyzed, oxidized, propoxylated, sulphonated, sulphomethylated or desulphonated and fractionated according to known processes, for example according to the molecular weight or according to the degree of sulphonation. Mixtures of sulphite and kraft ligninsulphonates are likewise very effective. Of particular suitability are ligninsulphonates having an average molecular weight between 1000 and 100,000, an active ligninsulphonate content of not less than 80% and preferably a low level of polyvalent cations. The degree of sulphonation can vary widely.

Examples of useful non-ionic dispersants are reaction products of alkylene oxides with alkylatable compounds, for example fatty alcohols, fatty amines, fatty acids, phenols, alkylphenols, arylalkylphenols, such as styrene-phenol condensates, carboxamides and resin acids. They are for example ethylene oxide adducts from the class of the reaction products of ethylene oxide with:

a1) saturated and/or unsaturated fatty alcohols of 6 to 22 carbon atoms or b1) alkylphenols having 4 to 12 carbon atoms in the alkyl radical or c1) saturated and/or unsaturated fatty amines of 14 to 20 carbon atoms or d1) saturated and/or unsaturated fatty acids of 14 to 20 carbon atoms or e1) hydrogenated or unhydrogenated resin acids.

Suitable ethylene oxide adducts are in particular the alkylatable compounds mentioned under a1) to e1) when combined with 5 to 120, especially 5 to 100, especially 5 to 60, particularly preferably 5 to 30, mol of ethylene oxide.

Suitable dispersants also include the esters of the alkoxylation product of the formula (X) known from DE-A 19 712 486, which has an earlier priority date, or from DE-A 19 535 246, which conform to the formula (XI) and also these optionally mixed together with the parent compounds of the formula (X). The alkoxylation product of a styrene-phenol condensate of the formula (X) is as hereinbelow defined:

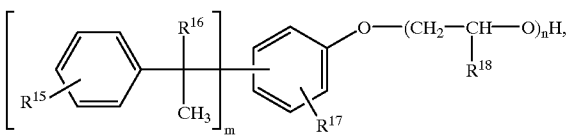

(X)

where
- $R^{15}$ is hydrogen or $C_1$–$C_4$-alkyl,
- $R^{16}$ is hydrogen or $CH_3$,
- $R^{17}$ is hydrogen, $C_1$–$C_4$-alkyl, $C_1$–$C_4$-alkoxy, $C_1$–$C_4$-alkoxycarbonyl or phenyl,
- m is from 1 to 4,
- n is from 6 to 120,
- $R^{18}$ is identical or different for each unit with the index n and represents hydrogen, $CH_3$ or phenyl subject to the proviso that in the case of $CH_3$ being present in the various —(—$CH_2$—$CH(R^{18})$—O—)— groups $R^{18}$ is $CH_3$ in 0 to 60% of the total value of n and is hydrogen in 100 to 40% of the total value of n and in the case of phenyl being present in the various —(—$CH_2$—$CH(R^{18})$—O—)— groups $R^{18}$ is phenyl in 0 to 40% of the total value of n and is hydrogen in 100 to 60% of the total value of n.

Esters of alkoxylation products (X) conform to the formula (XI)

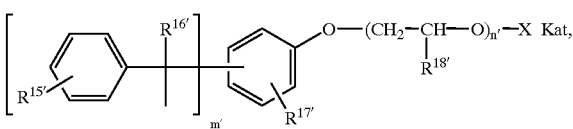

(XI)

where
- $R^{15'}$, $R^{16'}$, $R^{17'}$, $R^{18'}$, m' and n' assume the scope of meaning of $R^{15}$, $R^{16}$, $R^{17}$, $R^{18}$, m and n, respectively, but independently thereof,
- X is —$SO_3$, —$SO_2$, —$PO_3$ or —CO—($R^{19}$)—COO,
- Kat is a cation selected from the group consisting of $H^+$, $Li^+$, $Na^+$, $K^+$, $NH_4^+$ and HO—$CH_2CH_2$—$NH_3^+$, subject to the proviso that in the case of X=—$PO_3^-$ two cations are present, and
- $R^{19}$ is a divalent aliphatic or aromatic radical, preferably $C_1$–$C_4$-alkylene, especially ethylene, monounsaturated $C_2$–$C_4$ radicals, especially acetylene, or optionally substituted phenylene, especially ortho-phenylene, preferred substituents being $C_1$–$C_4$-alkyl, $C_1$–$C_4$-alkoxy, $C_1$–$C_4$-alkoxycarbonyl or phenyl.

Specific individual compounds of the formula (XI) are known for example from DE-A 19 712 486 and mixtures of the formulae (X) and (XI) for example from DE-A-19 535 256, which each form part of this application.

A preferred dispersant is the compound of the formula (XI). Preferably a compound of the formula (XI) where X is a radical of the formula —CO—($R^{19}$)—$COO^-$ and $R^{19}$ is as defined above.

Preference for use as dispersant is likewise given to a compound of the formula (XI) used together with a compound of the formula (X). In this case, the dispersant preferably contains 5 to 99% by weight of the compound (XI) and 1 to 95% by weight of the compound (X).

Polymeric dispersants are for example water-soluble and also water-emulsifiable compounds, for example homo- and copolymers such as random or block copolymers.

Particularly preferred polymeric dispersants are for example AB, BAB and ABC block copolymers. In the AB or BAB block copolymers, the A segment is a hydrophobic homopolymer or copolymer which provides a bond to the pigment and the B block is a hydrophilic homopolymer or copolymer or a salt thereof and ensures dispersal of the pigment in an aqueous medium. Such polymeric dispersants and their synthesis are known for example from EP-A-518 225 and EP-A-556 649.

The dispersant is preferably used in an amount of 0.1 to 100% by weight, especially 0.5 to 60% by weight, based on the use level of pigment in the pigment preparation.

The preparation may contain further additives, of course. For instance, additives which reduce the viscosity of an aqueous suspension and increase the solids content, such as the carboxamides and sulphonamides mentioned above for the spray drying, can be added in an amount of up to 10% by weight, based on the preparation. The additives which are customary for pigment preparations are also possible.

However, it is particularly preferable for the preparation of the invention to contain more than 90%, especially more than 95%, preferably more than 97%, by weight of pigment and optionally dispersant.

Preference is likewise given to pigment preparations having a viscosity of less than 80 mPa·s in an alkyd-melamine varnish system or less than 50 mPa·s$^1$ in an aqueous coating system or less than 300 mPa·s in an aqueous binder system, each measured according to DIN 53 019.

Inclusion compounds, intercalation compounds and solid solutions of the metal compounds per se are known in the literature. They and their preparation are described for example in EP 0 074 515 and EP 0 073 463. The products obtained by the production processes described therein however, are harsh-textured and difficult-to-disperse forms, making their use as pigments very difficult.

The preparation for these compounds as described for example in EP 0 073 464 takes the form of the synthesis of the azo compound being followed by complexing with a metal salt and thereafter, with or without intermediate isolation of the metal complex, by the reaction with the compound to be intercalated. In the case of the industrially useful intercalation compounds of the metal complexes, the di- and trivalent metals, especially the technically and economically important intercalation compound of the azobarbituric acid-nickel complex, the complexing and intercalation and also the subsequent isolation take place in the acidic pH range.

However, the drying of the products thus produced will usually, and regardless of the drying conditions, produce very harsh-textured and difficult-to-disperse pigments, which frequently do not possess the desired colour strength either. The problem of harsh texture and dispersibility arises in particular also in the case of the industrially useful intercalation compounds of the azobarbituric acid-nickel complex and here to a very particular degree in the case of the intercalation compound with melamine, which has appreciable significance both technically and economically.

It is known to improve the harsh texture, dispersibility and colour strength of pigments by various methods. Such processes are known for example from DE-A-2 214 700, DE-A-2 064 093 and DE-A-2 753 357.

But all these methods are very complicated and, what is more, frequently lead to losses in the space-time yield.

It has now been found, completely surprisingly, that the pigment preparations of the invention are appreciably softer in texture and very much better dispersible. In addition, substrates pigmented therewith have a comparatively higher colour strength and also a higher brilliance.

Likewise preferred pigment preparations are those which, in an alkyd/melamine resin system according to DIN 53 238 Part 31, following a dispersing time of just 2 hours, have a colour strength which is not less than 3%, preferably more than 10%, particularly more than 20% higher than that of the pigment whose dispersing harshness is >250, following a conforming dispersing time of 2 hours.

The solid pigment preparations are very useful for all pigment applications.

They are useful for example for pigmenting varnishes of all kinds for the production of printing colours, distemper colours or binder colours, for the mass coloration of synthetic, semisynthetic or natural macromolecular substances, especially polyvinyl chloride, polystyrene, polyamide, polyethylene or polypropylene, and for the spin-dyeing of natural, regenerated or artificial fibres, for example cellulose, polyester, polycarbonate, polyacrylonitrile or polyamide fibres, and also for printing textiles and paper. These pigments provide finely divided, stable, aqueous pigmentations of emulsion and paint colours which are useful for paper coloration, for the pigment printing of textiles, for laminating and also for the spin-dyeing of viscose, by grinding or kneading in the presence of non-ionic, anionic or cationic surfactants.

EXAMPLES

Example 1

425 g of water-moist paste of an azobarbituric acid sodium salt having a solids content of 40%, corresponding 170 g in the dry state, are homogeneously suspended in 5000 ml of distilled water using a laboratory stirrer. Thereafter, 122.4 g of $NiCl_2.6H_2O$ and 126.1 g of melamine are added, and the suspension is subsequently heated to 95° C. and stirred at 95° C. for 2 hours. The suspension is then adjusted to pH 5.0 with sodium acetate. This is followed by isolating on a suction filter, washing electrolyte-free, drying in a vacuum drying cabinet at 80° C. and grinding in a customary laboratory mill for about 2 minutes.

The pigment powder thus obtained has a surface area of 160 $m^2/g$.

Dispersing harshness: greater than 250

Example 2

657 g of water-moist paste of a melamine intercalation compound of the azobarbituric acid-nickel complex prepared according to Example 1, with a solids content of 45%, corresponding to 295.6 g in the dry state, are added to an initial charge of 5000 ml of distilled water and stirred in homogeneously using a laboratory stirrer, and the suspension thus prepared is adjusted to an acidic pH with hydrochloric acid, then heated in an autoclave to a certain temperature and heat-treated at that temperature and that pH for 2 hours (see table). This is followed by cooling down to 95° C. and the setting of the pH to 5.0 with aqueous sodium hydroxide solution to isolate the product.

The product is then isolated on a suction filter, washed electrolyte-free, dried at 80° C. in a vacuum drying cabinet and ground for 2 minutes in a customary laboratory mill.

When Example 2 is repeated with other heat treatment conditions, similar properties are obtained (see Table 1).

TABLE 1

| | Heat treatment | | | | | |
|---|---|---|---|---|---|---|
| Ex. | Temperature (° C.) | Time (h) | pH | Specific surface area BET ($m^2/g$) | Dispersing harshness[2] | Viscosity[3] (mPa · s) |
| 2 | 100 | 2 | 2 | 88 | <250 | |
| 3 | 120 | 2 | 2 | 70 | <250 | |
| 4 | 140 | 2 | 2 | 67 | <250 | |
| 5 | 160 | 2 | 2 | 54 | <250 | |
| 6 | 95 | 2 | 1.5 | 80 | <250 | |
| 7 | 95 | 2 | 11 | 130 | <250 | |
| 8[1] | 95 | 2 | 2.5 | 120 | <250 | |
| 9 | 90 | 2 | 2.0 | 130 | <250 | |
| 10a | 98 | 0 | 2.0 | 160 | 530 | 1477[4] |
| 10b | 98 | 3 | 2.0 | 110 | 410 | 901[4] |
| 10c | 98 | 5 | 2.0 | 90 | 312 | 754[4] |
| 10d | 98 | 8 | 2.0 | 85 | 143 | 269[4] |
| 11a | 98 | 0 | 2.0 | 160 | 530 | 155[5] |
| 11b | 98 | 3 | 2.0 | 110 | 410 | 61[5] |
| 11c | 98 | 5 | 1.0 | 90 | 312 | 43[5] |
| 11d | 98 | 8 | 2.0 | 85 | 143 | 23[5] |
| 12a | 98 | 0 | 2.0 | 160 | 530 | 100[6] |
| 12b | 98 | 3 | 2.0 | 110 | 410 | 90[6] |
| 12c | 98 | 5 | 2.0 | 90 | 312 | 75[6] |
| 12d | 98 | 8 | 2.0 | 85 | 143 | 75[6] |
| 13 | 97 | 2 | 2.0 | 120 | 220 | 425 |

[1] heat treatment without intermediate isolation; pigment suspension at pH 5 is not isolated, but readjusted (with hydrochloric acid) to pH 2 and dried at 95° C. for 2 hours. It is then adjusted to pH 5 and isolated and worked up as described in Example 2.
[2] measured according to DIN 53 775 Part 7
[3] measured using an RV20 Haake rotary viscometer
[4] after incorporation in aqueous binder
[5] after incorporation in aqueous coating system
[6] after incorporation in solvent-containing coating system (alkyd-melamine according to DIN 53 019)

Example 14 a) 425 g of water-moist paste of an azobarbituric acid sodium salt having a solids content of 40%, corresponding to 170 g in the dry state, are homogeneously suspended in 5000 ml of distilled water using a laboratory stirrer. Thereafter, 122.4 g of $NiCl_2.6H_2O$ and 126.1 g of melamine are added, and the suspension is subsequently heated to 95° C. and stirred at 95° C. for 2 hours. The suspension is then adjusted to pH 5.0 with sodium acetate. This is followed by isolating on a suction filter and washing electrolyte-free.

b) Half of the paste is then suspended in 2500 ml of distilled water. This is followed by adjustment with hydrochloric acid to pH 2.0 and heating to 97° C. and subsequent stirring at that temperature for 5 hours. The product is then isolated on a suction filter and washed electrolyte-free.

3287.4 g of water-moist paste of Example 14a having a solids content of 45%, corresponding to 147.8 g in the dry state, are then added to an initial charge of 29.6 g of 25% strength by weight ammonia solution, 363 g of demineralized water, 2.4 g of diethanolamine and 2.3 g of ε-caprolactam. The mixture is then homogeneously stirred using a laboratory stirrer, the resulting suspension having a solids content of 20.9%.

The melamine intercalation compound of the azobarbituric acid-nickel complex prepared according to Example 14b is added to 29.6 g of 25% strength by weight ammonia solution, 130 g of demineralized water, 2.4 g of diethanolamine and 2.3 g of ε-caprolactam. This is followed by homogeneous stirring with a laboratory stirrer. In contrast to the suspension of Example 14a, the solids content was 30.9%.

These suspensions are used for spray drying.
Dispersing harshness: <250
A free-flowing, low-dust granular product is obtained.
What is claimed is:

1. A process for preparing a metal complex composition exhibiting a dispersing harshness less than 250 and comprising
    (a) at least one metal complex of an azo compound conforming to the formula (I)

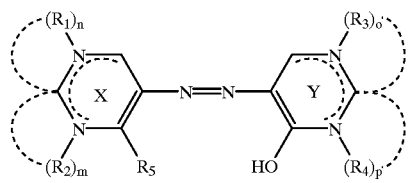

or a tautomeric form thereof,
wherein
rings X and Y independently are optionally substituted with one or two substituents selected from the group consisting of =O, =S, =$NR_7$, —$NR_6H_7$, —$OR_6$, —$SR_6$, —$COOR_6$, —CN, —$CONR_6R_7$, —$SO_2R_8$,

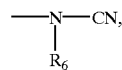

alkyl, cycloalkyl, aryl, and aralkyl,
the dotted lines in each of the rings X and Y optionally represent one or two double bonds such that the total number of endocyclic and exocyclic double bonds is three for each of the rings X and Y,
$R_1$, $R_2$, $R_3$, and $R_4$ are independently hydrogen, alkyl, cycloalkyl, aryl, or aralkyl, or $R_1$ and $R_2$ together and/or $R_3$ and $R_4$ together form 5- or 6-membered rings, as indicated by the broken lines, to which further rings are optionally fused,
m, n, o, and p are 1 when the corresponding ring nitrogen atom is not part of a double bond or are zero when the corresponding ring nitrogen atom is part of a double bond, as indicated by the dotted lines,
$R_5$ is —OH, —$NR_6R_7$, alkyl, cycloalkyl, aryl, or aralkyl,
$R_6$ is hydrogen, alkyl, cycloalkyl, aryl, or aralkyl,
$R_7$ is hydrogen, cyano, alkyl, cycloalkyl, aryl, aralkyl, or acyl,
$R_8$ is alkyl, cycloalkyl, aryl or aralkyl,
with the proviso that $R_1$ to $R_8$ are optionally further substituted by replacing the hydrogen atom of a CH group, and
    (b) at least one guest compound, said process comprising
        (1) preparing a metal complex of an azo compound conforming to the formula (I) in the presence of water and, optionally, an organic solvent at a pH of ≦2,
        (2) forming an intermediate educt of the metal complex of the azo compound and at least one guest compound, wherein said educt is characterized by exhibiting a dispersing harshness greater than 250, at a pH of 1 to 7,
        (3) heating the educt at a temperature of 80 to 180° C., with the proviso that if the heating step is carried out at a pH of <4, the heated educt is subsequently adjusted to a pH of >4.5,
        (4) optionally additionally heating the educt, either in suspension or as an isolated solid, at a temperature of 80 to 180° C. at a pH of 1 to 4 or pH 9 to 13, and
        (5) collecting the resultant metal complex composition.

2. A process according to claim 1 wherein in formula (I) the X ring represents a ring of the formula

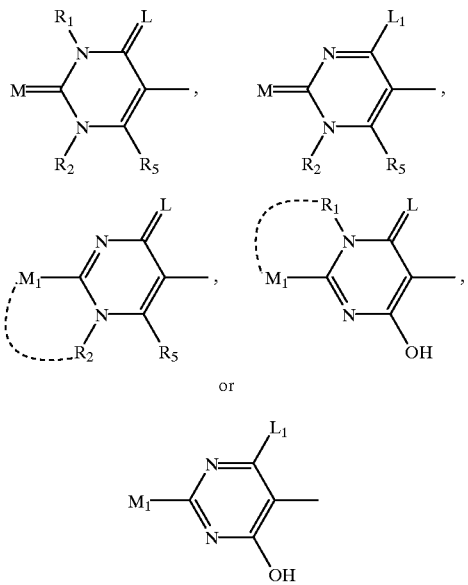

or

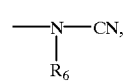

wherein

L and M are each independently =O, =S, or =$NR_6$, $L_1$ is hydrogen, —$OR_6$, —$SR_6$, —$NR_6R_7$, —$COOR_6$, —$CONR_6R_7$, —CN, alkyl, cycloalkyl, aryl, or aralkyl, $R_1$ and $R_2$ are independently hydrogen, alkyl, cycloalkyl, aryl, or aralkyl, $R_5$ is —OH, —$NR_6R_7$, alkyl, cycloalkyl, aryl, or aralkyl, $R_6$ is hydrogen, alkyl, cycloalkyl, aryl, or aralkyl, $R_7$ is hydrogen, cyano, alkyl, cycloalkyl, aryl, aralkyl, or acyl, and $M_1$ is —$OR_6$, —$SR_6$, —$NR_6R_7$, —$COOR_6$, —$CONR_6R_7$, —CN, —$SO_2R_8$,

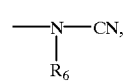

alkyl, cycloalkyl, aryl, or aralkyl, or $M_1$ and $R_1$ together or $M_1$ and $R_2$ together form a 5- or 6-membered ring, as indicated by the broken lines.

3. A process according to claim 1 wherein in formula (I) the X ring represents a ring of the formula

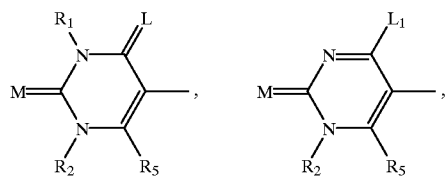

-continued

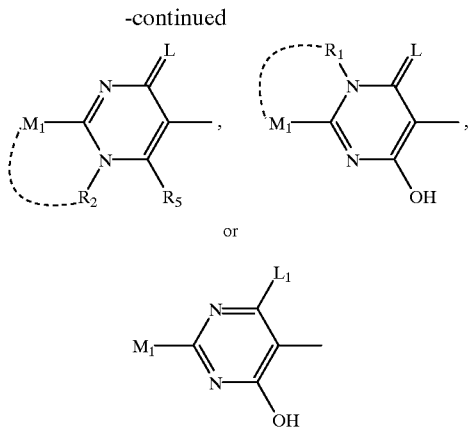

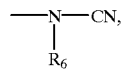

wherein

L and M are each independently =O, =S, or =NR$_6$,

L$_1$ is hydrogen, —OR$_6$, —SR$_6$, —NR$_6$R$_7$, —COOR$_6$, —CONR$_6$R$_7$, —CN, alkyl, cycloalkyl, aryl, or aralkyl, R$_1$ and R$_2$ are independently hydrogen, alkyl, cycloalkyl, aryl, or aralkyl, R$_5$ is —OH, —NR$_6$R$_7$, alkyl, cycloalkyl, aryl, or aralkyl, R$_6$ is hydrogen, alkyl, cycloalkyl, aryl, or aralkyl, R$_7$ is hydrogen, cyano, alkyl, cycloalkyl, aryl, aralkyl, or acyl, and M$_1$ is —OR$_6$, —SR$_6$, —NR$_6$R$_7$, —COOR$_6$, —CONR$_6$R$_7$, —CN, —SO$_2$R$_8$, $$-\underset{R_6}{N}-CN,$$

alkyl, cycloalkyl, aryl, or aralkyl, or M$_1$ and R$_1$ together or M$_1$ and R$_2$ together form a 5- or 6-membered ring, as indicated by the broken lines.

4. A process according to claim 1 wherein the azo compound of the formula (I) conforms to the formula (V)

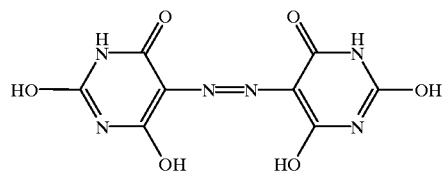

or a tautomeric form thereof.

5. A process according to claim 1 wherein the metal complex is a salt or a complex of a monoanion, dianion, trianion, or tetraanion of an azo compound conforming to formula (I) with a metal selected from the group consisting of Li, Cs, Mg, Cd, Co, Al, Cr, Sn, Pb, Na, K, Ca, Sr, Ba, Zn, Fe, Ni, Cu, and Mn.

6. A process according to claim 1 wherein the metal complex is a Ni salt or complex of the azo compound of the formula (I).

7. A process according to claim 1 wherein the guest compound is a cyclic or acyclic organic compound.

8. A process according to claim 1 wherein the guest compound is melamine.

9. A process according to claim 1 wherein the metal complex composition is characterized by a BET surface area of less than 150 m$^2$/g.

10. A metal complex composition prepared according to the process of claim 1.

11. A pigment preparation comprising at least one metal complex composition prepared according to the process of claim 1 and at least one dispersant.

12. A method for preparing printing colors, distemper colors, or binder colors comprising adding to a varnish a metal complex composition prepared according to the process of claim 1.

13. A method for mass coloring synthetic, semisynthetic, or natural macromolecular substances comprising introducing into a synthetic, semisynthetic, or natural macromolecular substance a metal complex composition prepared according to the process of claim 1.

14. A method for spin-dyeing natural, regenerated, or artificial fibers comprising applying to a natural, regenerated, or artificial fiber during the fiber spinning process a dye composition containing a metal complex composition prepared according to the process of claim 1.

15. A method for printing textiles or paper comprising applying to a textile or paper a printing preparation containing a metal complex composition prepared according to the process of claim 1.

* * * * *